United States Patent Office 3,632,530
Patented Jan. 4, 1972

3,632,530
PROCESS FOR DECOMPOSITION OF A
POLYURETHANE RESIN
Osamu Kinoshita, Tokyo, Japan, assignor to Yokohama Rubber Co., Ltd., Tokyo, Japan
No Drawing. Filed Feb. 29, 1968, Ser. No. 709,196
Claims priority, application Japan, Mar. 4, 1967, 42/13,470
Int. Cl. C08f 47/24
U.S. Cl. 260—2.3          7 Claims

ABSTRACT OF THE DISCLOSURE

An improved process for decomposition of a polyurethane resin in which polyurethane resin is heated in a glycol having from two to six carbon atoms and a valuable polyol compound and an amino compound which are capable of reuse for the formation of polyurethane resin and cross-linking agent for an epoxy resin and a reinforcing agent for polyurethane foam are recovered, further in which process, a tertiary amine being added to said glycol in order to decrease the decomposition temperature of said polyurethane resin.

BACKGROUND OF INVENTION

When polyurethane resins such as polyurethane foams and polyurethane elastomers are produced on a commercial scale, there is a great deal of waste and trimmings. It is highly desirable to recover the polyurethane starting materials and/or valuable compounds from such waste and trimmings. U.S. Pat. 2,737,151 discloses that if polyurethane resin waste is dissolved in a liquid polyalkylene ether of glycol, a polyester is produced from the glycol and a dibasic acid and a polyamide ester is produced from the glycol, a dibasic acid and an amine compound at a temperature of about 250° C. under atmospheric pressure. However, this patent does not teach the recovery of starting materials and valuable compounds.

To dissolve a polyurethane resin in a primary amine has been disclosed in U.S. Pat. 3,117,940; however, primary amines are expensive.

It has long been known that a compound containing urethane and urea linkages is decomposed into an isocyanato, an amine and an alcohol by thermal dissociation at a temperature of about 250° C.

SUMMARY OF INVENTION

It has been found that the thermal dissociation of a compound containing urethane and/or urea linkages is accelerated in the presence of glycols. The polymers employed in this invention include rigid polyurethane foam containing urethane linkages and no urea linkage, flexible polyurethane foam containing a major proportion of urea linkages and urethane linkages, and polyurethane elastomer containing a major proportion of urethane linkages and urea linkages. Accordingly, in this specification and claims, the term "polyurethane resin," is intended to include all such materials.

It has been found that the dissociation of polyurethane resin starts at a temperature of about 180° C. in an alcohol solution. It is desirable that the alcohol be immiscible with the polyalkylene ether of a polyol compound but miscible with the amine compound which are decomposition products of the polyurethane resin, and such miscibility results in easy recovery of the products. Glycols having a boiling point above 160° C. are suitable such as ethylene, propylene, butylene, diethylene and dipropylene glycols.

Said glycols are immiscible with a polyalkylene ether of polyol, but are miscible with the amine compound which is a decomposition product of the polyurethane resin. Thus, the polyurethane resin is thermally dissociated in the presence of such glycols; and then upon standing, the reaction system separates into two layers, one layer being glycol containing the amines and the other being the polyalkylene ether of a polyol.

The amines and glycol in the glycol layer are readily separated by fractional distillation, and the glycol is useful for preparation of polyurethane resin.

When polyurethane resin is heated the following thermal dissociation takes place:

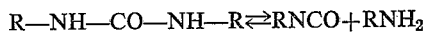
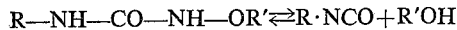

In the above reactions the reaction rates of the isocyanate with amine and alcohol are higher than the thermal dissociation. However, if a glycol is present in the system according to this invention the isocyanate of the dissociation product immediately reacts with the glycol to remove it from the system, because the reaction rate of the glycol and the isocyanate is high. Thus the dissociation of the polyurethane resin is accelerated.

In accordance with this invention, the temperature employed in the dissociation reaction ranges from 160° to 200° C. and preferably from 170° to 185° C., and the reaction is carried out under reflux conditions. The polyurethane resin gradually dissolves in the glycol as the dissociation proceeds, the end point of the reaction being reached when solid material can no longer be seen.

The weight of the glycol is at least the same, and preferably two to three times the weight of the polyurethane resin. The treating time varies depending upon reaction temperature, degree of agitation and particle size of the resin to be treated but generally a treating time of from four to eight hours is preferred.

The reaction products according to this invention separate into two layers upon cooling and standing, the upper layer being a polyalkylene ether of a polyol, and the lower layer being a glycol containing amine compounds. The amine compounds, when distilled out of the glycol, are in the form of a viscous black paste and examination by infrared spectrum has disclosed that amino hydrogen, urethane linkage and hydroxy group are present. The ether is one of the raw materials employed for preparing the polyurethane resin.

When flexible polyurethane resin produced from the polyalkylene ether of a triol (molecular weight 3000 and hydroxyl number 56) and tolylene diisocyanate is treated according to the present invention, a polyalkylene ether of the triol and two amines of the following formulas are formed:

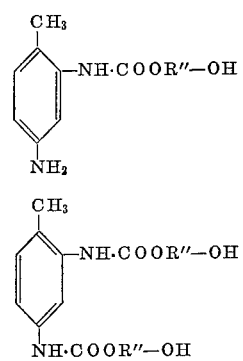

wherein R″ represents alkylene.

The yield of polyalkylene ether of polyol and amine is from about 95% to nearly 100% of stoichiometric amounts; thus, the dissociation reaction according to this invention is carried out at close to the theoretical maximum yield.

The amines produced by this invention are miscible with an epoxy compound, a polyalkylene ether of a polyol, or a prepolymer of polyurethane resin and are useful as cross-linking agents for epoxy resin, reinforcing agents for polyurethane foam and cross-linking agents for polyurethane elastomer.

When a tertiary amine is added to the glycol, the reaction temperature may be decreased. Suitable tertiary amines include triethylene diamine, dimethyl piperazine, triethanol amine, and dimethylaniline. The amount of the tertiary amine employed is the minimum amount required to impart catalytic action, for example a few percent of the glycol. In the presence of the tertiary amine the dissociation can be carried out at a temperature as low as 150° C., but preferably at 165° to 185° C.

EXAMPLE 1

A liter flask equipped with a stirrer, thermometer and reflux condenser was charged with 487 g. of propylene glycol.

The flask was immersed in an oil bath and heated at 200° C. with agitation whereby the propylene glycol was refluxed. Then, 230 g. of flexible polyurethane foam which was produced by a conventional process from the ingredients shown in Table 1 was introduced and dissolved in the glycol.

TABLE 1

| | G. |
|---|---|
| Triol (M.W.=300, hydroxyl number=56, adduct of propylene glycol and glycerol) | 100 |
| L-520 (silicone oil, available from Union Carbide Corporation) | 1.5 |
| Water | 5.0 |
| Trimethylene diamine | 0.1 |
| N-methylmorpholine | 0.4 |
| Stannous octoate | 0.3 |
| Tolylene diisocyanate (2,4 isomer/2,6 isomer= 80/20) | 75.0 |

As the polyurethane foam dissolved, the color of the propyleneglycol gradually changed to light yellow, yellow and finally brown and the foam was completely dissolved after 5 hours. When solid material could no longer be seen in the propylene glycol, the dissociation reaction was considered to be completed.

The reaction mass stood in a separating funnel overnight to cool and separate. It separated into two layers, the lower layer constituting about 5/6 of the volume. The lower layer was recovered and excess propylene glycol was distilled out at 63° C. at 2 mm. Hg to leave 120 g. of a black paste. The paste was washed with water and dried. Peaks in the infra red spectrum at 3390 cm.$^{-1}$, 1230 cm.$^{-1}$ and 1710 cm.$^{-1}$ proved it to be an amine compound containing an amino radical and a urethane linkage.

The upper layer was washed with water and ethylene glycol and dried to recover 135 g. of a yellow oily material. The dried oily material was also tested by infra red spectrum and it has an absorption at 1100 cm.$^{-1}$, the same value as the triol mentioned in Table 1; thus, the triol recovered was the same as the raw material.

EXAMPLE 2

The procedures in Example 1 were repeated except that 250 g. of ethyleneglycol and 140 g. of polyurethane foam were employed and heated at 175° C. for four and one-half hours.

During the treatment the reaction mass changed to dark brown and after four hours no solid material was observed. The mass was allowed to stand and cool and after eight hours two separate layers were formed.

The lower layer was distilled at a temperature of 86° C. under a pressure of 2 mm. Hg to remove excess ethylene glycol and a black viscous paste was recovered. The paste had the same infra red spectrum as the paste in Example 1.

The upper layer was purified as in Example 1 and examination by infra red spectrum showed to be the triol of starting material.

EXAMPLES 3–5

Polyurethane foams were treated with butylene glycol, diethylene glycol and dipropylene glycol, respectively, according to the procedures in Example 1. The results are shown in Table 2.

TABLE 2

| | Butylene glycol | Diethylene glycol | Propylene glycol |
|---|---|---|---|
| Amount of glycol (g.) | 100 | 100 | 100 |
| Amount of foam (g.) | 50 | 50 | 50 |
| Reaction temperature (° C.) | 180 | 180 | 180 |
| Reaction time (hrs.) | 5 | 5 | 6 |
| Product | (*) | (*) | (*) |
| Recovery temperature of glycol (° C./2 mm. Hg) | 95 | 98 | 105 |
| Recovery of polyol | Possible | Possible | Possible |

*Two separate layers.

EXAMPLE 6

Polyurethane elastomer produced from Adiprene L-100 available from E. I. du Pont de Nemours and Co. and 4,4'-methylene-bis-2-chloroaniline was treated in 300 g. of propylene glycol under reflux for 6 hours according to the procedures in Example 1. After five hours the elastomer was completely dissolved and the reaction system had a brown colour.

Upon cooling the system separated into two layers. The lower layer was 100 g. of a viscous liquid and the upper layer contained excess propylene glycol from which the glycol was distilled out to recover amine compounds in the form of a black paste.

EXAMPLE 7

The oily material obtained in Example 1, that is triol, was employed for preparing flexible polyurethane foam, the ingredients and properties of the products are shown in Table 3.

TABLE 3

| | | | |
|---|---|---|---|
| Triol (M.W.=300, glycerine-propyleneoxide adduct) (g.) | 100 | 50 | 0 |
| Triol produced in Example 1 (g.) | 0 | 50 | 100 |
| Triethylene diamine (g.) | 0.1 | 0.1 | 0.1 |
| N-methyl morpholine | 0.2 | 0.2 | 0.2 |
| L-520 (silicone oil) | 1.5 | 1.5 | 1.5 |
| Water | 3.5 | 3.5 | 3.5 |
| Stannous octoate | 0.3 | 0.1 | 0.1 |
| Tolylene diisocyanate (2,4-isomer/2,6-isomer= 80/20) | 45 | 45 | 45 |
| Indentation load deflection (g./cm.²) (ILD)* | 30 | 39 | 32 |
| Density (g./cm.³) | 0.030 | 0.032 | 0.031 |
| Tensile strength (kg./cm.²) (JIS-K-6402) | 0.8 | 0.8 | 0.8 |
| Compression set (percent) (JIS-K-6401) | 2.1 | 2.5 | 2.1 |
| Elongation (percent) (JIS-K-6402) | 180 | 180 | 200 |

*25% deflection, 25 mm. thickness.

EXAMPLE 8

The amine compound (black paste) produced in Example 1 was employed as cross-linking agent for an epoxy resin.

100 g. of Epycoat #815 was admixed with three portions of the paste, that is 75 g., 85 g. and 95 g. under agitation, and charged into three molds to prepare specimens 12 mm. x 200 mm. x 2 mm. in size and the cross-linking reaction was carried out in an oven at a temperature of 120° C. for four hours. The properties of the resins thus obtained are shown in Table 4.

TABLE 4

| Amount of crosslinking agent for 100 g. of Epycoat #815 | Hardness, durometer Shore D | Flexure strength (kg./mm.$^2$) | Tensile strength (kg./mm.$^2$) |
| --- | --- | --- | --- |
| 14 g. of m-phenylene diamine | 80–85 | 1.1 | 5.2 |
| 75 g. of the paste | 80–85 | 1.0 | 5.0 |
| 85 g. of the paste | 78–83 | 0.9 | 4.5 |
| 95 g. of the paste | 75–70 | 0.7 | 4.2 |
| 12 g. of triethylene tetramine | 75–80 | 1.0 | 3.5 |

EXAMPLE 9

A 200 ml. glass vessel was charged with 100 g. of Desmophene and 45 g. of 4,4′-methylene diphenyldiisocyanate and the mixture was reacted at 120° C. for 20 minutes in a nitrogen stream.

The resulting product was admixed with 9 g. of butylene glycol at 70° C. with agitation and introduced into a mold to produce polyester type polyurethane foam.

In the apparatus of Example 1 300 g. of propylene glycol was heated to boiling; then 100 g. of the foam was added and heating was continued with agitation for seven hours at which time the reaction mass was brown and the foam was completely dissolved. After cooling no separation of the system was observed.

EXAMPLE 10

The black pastes produced in Examples 1 and 4 were employed as reinforcing agents for semi-rigid polyurethane foam. The proportion of the ingredients and of the foam are listed in Table 5.

TABLE 5

| Polyol (glycerine-alkylene oxide adduct, hydroxyl number=42) (g.) | 100 | 100 | 100 | 100 | 100 |
| --- | --- | --- | --- | --- | --- |
| Paste of Example 1 (g.) | 10 | 20 | 30 | | |
| Paste of Example 4 (g.) | | | | | 10 |
| Dimethyl ethanol amine (g.) | 1.0 | 1.0 | 0.7 | 0.5 | 0.7 |
| Water (g.) | 2.5 | 2.5 | 3.0 | 3.5 | 2.5 |
| Crude 4,4′-methylene | 47 | 59 | 79 | 85 | 59 |
| Diphenyldiisocyanate density (g./cm.$^3$) | 50 | 55 | 60 | 65 | 55 |
| ILD (g./cm.$^2$): | | | | | |
| 25% | 31 | 90 | 250 | 980 | 120 |
| 50% | 42 | 110 | 280 | 1,150 | 140 |
| Rebound test | 40 | 35 | 35 | 20 | 35 |

This example shows that a polyol having a hydroxyl number lower than that ordinarily deemed suitable for flexible polyurethene foam can be employed together with the amino compounds produced according to the invention in the preparation of semi-rigid polyurethane foam.

EXAMPLE 11

The black paste produced in Example 3 employing butylene glycol was employed as cross-linking agent for a polyurethane elastomer.

Paste in the amount of 5 g., 7.5 g. and 10 g. was heated at about 40°–50° C. in order to reduce the viscosity thereof and then was mixed with 100 g. of Adiprene 100 at about 40°–50° C. The resulting mixtures were put into iron molds and heated in an oven at 150° C. for three hours to form molded articles. The properties of said articles are listed in Table 6.

TABLE 6

| Amount of paste (g.) | Elongation (percent) | Tensile strength (kg./cm.$^2$) | Hardness (JIS-K-6351) |
| --- | --- | --- | --- |
| 5.0 | 800 | 270 | 60 |
| 7.5 | 100 | 200 | 45 |
| 10.1 | >1,000 | 120 | 40 |

EXAMPLE 12

100 g. batches of propylene glycol and 2 g. of respective tertiary amines shown in Table 7 were mixed in 300 cc. beakers, heated at 140° and two cubes (2 x 2 x 2 cm.) of polyurethane foam were charged into each beaker. Then heating was continued to allow a temperature rise of 5° C. per minute and the temperatures at which the foams were dissolved were measured and the results are given in Table 7.

TABLE 7

| Amine compound: | Dissolving temperature (° C.) |
| --- | --- |
| None | 190 |
| Triethylene diamine | 165 |
| Triethanol amine | 180 |
| Dimethyl aniline | 185 |
| Dimethyl piperazine | 175 |

What is claimed is:

1. A process for decomposing a polyurethane resin which comprises heating said resin in a liquid medium consisting essentially of a glycol having two to six carbon atoms at a temperature of 150° to 200° C. until the resin is thermally dissociated into a polyol and an amine.

2. A process as set forth in claim 1 wherein said glycol is ethylene glycol, propylene glycol, butylene glycol, diethylene glycol, or dipropylene glycol, said medium is held at said temperature under reflux conditions, the resulting reaction mixture is permitted to cool and to separate into a first layer of polyol polyalkylene ether and a second layer of said glycol containing said amine, and said second layer is distilled to recover said amine as a residue.

3. A process as set forth in claim 1, wherein said temperature is 170° to 185° C.

4. A process as set forth in claim 1, wherein the weight of said glycol in said medium is at least equal to the weight of said resin.

5. A process as set forth in claim 1, wherein the weight of said glycol in said medium is two to three times the weight of said resin.

6. A process as set forth in claim 1, wherein said glycol is ethylene glycol, propylene glycol, butylene glycol, diethylene glycol, or dipropylene glycol, and said medium contains a small amount of a tertiary amine effective to permit a reduction in said temperature to 150° to 185° C.

7. A process as set forth in claim 6, wherein said amine is triethylene diamine, triethanolamine, dimethylpiperazine, or dimethylaniline.

References Cited

UNITED STATES PATENTS 3,117,940  1/1964  McElroy _____ 260—2.3
3,404,103  10/1968  Matsudaira et al. ____ 260—2.3

LORRAINE A. WEINBERGER, Primary Examiner

L. A. THAXTON, Assistant Examiner

U.S. Cl. X.R.

260—471 C